United States Patent
Skinner (10) Patent No.: US 8,494,126 B2
(45) Date of Patent: Jul. 23, 2013

(54) METHOD AND APPARATUS FOR PROVIDING IVR SYSTEM REQUESTED DATA

(75) Inventor: Cory Robert Skinner, Kitchener (CA)

(73) Assignee: Research In Motion Limited, Waterloo (CA)

( * ) Notice: Subject to any disclaimer, the term of this patent is extended or adjusted under 35 U.S.C. 154(b) by 540 days.

(21) Appl. No.: 12/696,126

(22) Filed: Jan. 29, 2010

(65) Prior Publication Data

US 2011/0188644 A1    Aug. 4, 2011

(51) Int. Cl.
*H04M 11/00* (2006.01)
*H04M 1/64* (2006.01)

(52) U.S. Cl.
USPC ................ 379/88.18; 379/88.23

(58) Field of Classification Search
USPC .......................... 379/88.01–88.25
See application file for complete search history.

(56) References Cited

U.S. PATENT DOCUMENTS

| 6,389,398 | B1 | 5/2002 | Lusgarten et al. |
| 7,317,789 | B2 | 1/2008 | Comerford |
| 8,175,651 | B2 * | 5/2012 | Rios et al. ............ 455/566 |
| 2008/0140665 | A1 * | 6/2008 | Ariel et al. ............ 707/9 |
| 2009/0154666 | A1 * | 6/2009 | Rios et al. ............ 379/88.18 |
| 2010/0296638 | A1 * | 11/2010 | Wang ................ 379/88.04 |

FOREIGN PATENT DOCUMENTS

GB       2389480      12/2003

OTHER PUBLICATIONS

"Apparatus in Phone Set to Enable Automatic Interaction with IVR System", IP.Com Journal, IP.Com Inc., West Henrietta, NY, US, Aug. 6, 2009.
Tsai et al., "VoiceXML Dialog System of the Multimodal IP-Telephony-The Application for Voice Ordering Service", Expert Systems with Applications, Oxford, GB, vol. 31, No. 4, Nov. 1, 2006.
Rouillard, "Web Services and Speech-Based Applications", 2006 ACS/IEEE International Conference on Pervasive Services, Jun. 26-29, 2006, Piscataway, NJ, USA, IEEE, Jan. 1, 2006.

* cited by examiner

*Primary Examiner* — Mohammad Islam
(74) *Attorney, Agent, or Firm* — Ridout & Maybee LLP (57) ABSTRACT

A method and electronic device for storing and transmitting response data in an interactive voice response (IVR) system session are provided. Response data, such as a credit card number, system access code or password may be stored in the device. During an IVR session, the response data may be selected, retrieved and transmitted to respond to an IVR request. Content protection may be used to control access to the response data and to allow access to the response data if an IVR session is established.

18 Claims, 3 Drawing Sheets

METHOD AND APPARATUS FOR PROVIDING IVR SYSTEM REQUESTED DATA

TECHNICAL FIELD

The present application relates to a method, device, and computer program product for providing a response to a request in an interactive voice response (IVR) system and, in particular, to a method, device, and computer program product for securely storing response data and enabling transmission of response data during an IVR session.

BACKGROUND

Interactive voice response (IVR) systems employ computer-telephony technology to automate many voice call system functions. IVR systems may be used to provide menu options and route calls in an organization, solicit data from a user at the beginning of a call, provide data in response to user inquiries and automate many complex functions, such as providing telephone banking services. An IVR session may be used at the beginning of a voice call to retrieve specific information from a person, such as an account number and request type, before routing the call to a live voice session with another person.

In order to interact with an IVR system to obtain data or services, a user typically is requested to select a numbered menu option or to provide information, such as an account number, credit card number, bank card number, or system access sequence. The user responds to IVR requests and inputs data typically by pressing keypad, touchscreen or keyboard buttons on a user device such as a mobile phone to generate dual-tone multi-frequency (DTMF) commands which are understood by the IVR system. If the IVR system employs speech recognition technology, the user may provide a spoken response.

BRIEF DESCRIPTION OF THE DRAWINGS

Like reference numerals are used in the drawings to denote like elements and features.

DETAILED DESCRIPTION OF EXAMPLE IMPLEMENTATIONS

The present disclosure provides a method and device for storing and transmitting response data in an interactive voice response (IVR) system session. The method and device of the present disclosure store response data in memory in the device. During an IVR session, the response data may be selected, retrieved and transmitted or played to respond to an IVR request. Response data may include a series of characters and symbols such as a credit card number, system access code or service agreement number.

According to one example implementation there is provided a method of providing response data in interactive voice response (IVR) system sessions by electronic devices. The method comprises: storing response data in a memory of an electronic device; establishing a voice call between the electronic device and an IVR system; receiving, at the electronic device, a select response data command during an IVR session with the IVR system; in response to the select response data command, retrieving the response data from the memory; and transmitting the response data to the IVR system.

According to another example implementation is an electronic device for providing response data in interactive voice response (IVR) system sessions. The electronic device comprises: a voice communications interface; a controller for controlling the operation of the electronic device; a memory connected to the controller, for storing response data; and the controller being configured to: store the response data in the memory; establish a voice call to an IVR system; receive a select response data command; retrieve the response data in response to receiving the select response data command; and transmit the response data to the IVR system.

According to another example implementation of the present disclosure, there is provided a computer-readable storage medium in an electronic device having a voice communications interface for connecting to interactive voice response (IVR) systems, the medium having stored thereon computer-readable and computer-executable instructions, which, when executed by a processor, cause the electronic device to perform actions comprising: storing response data in a memory of the electronic device; establishing a voice call between the electronic device and an IVR system; receiving, at the electronic device, a select response data command during an IVR session with the IVR system; in response to the select response data command, retrieving the response data from the memory; and transmitting the response data to the IVR system.

Example implementations described below refer to a mobile communications device such as a cellular telephone or smartphone. It will be appreciated that the present disclosure is not limited to mobile devices and in some implementations may comprise a wired telephone device, or a personal computer or notebook which supports voice communications.

Figure 1:
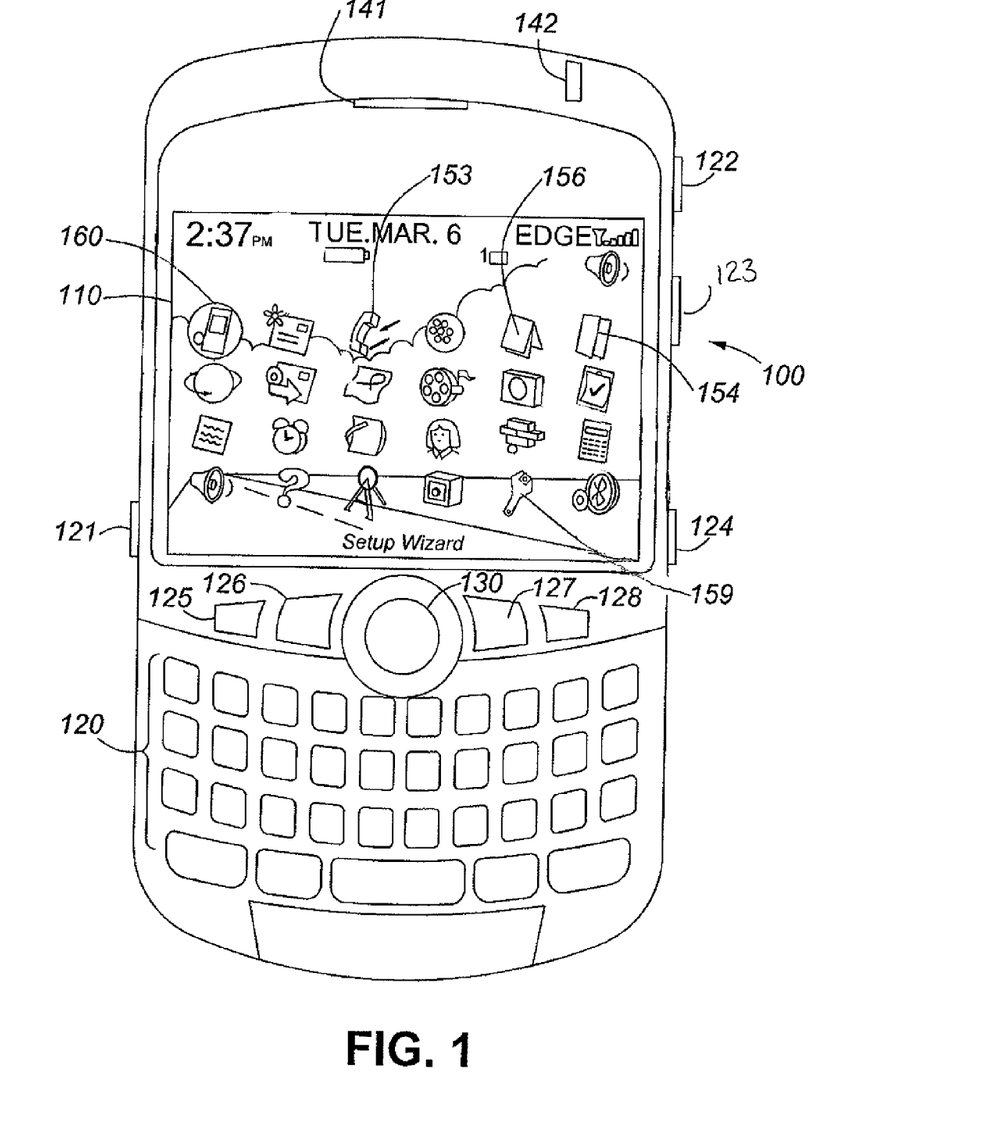
FIG. 1 is a graphical representation of a front view of an example of a mobile communications device.

FIG. 1 illustrates a graphical representation of a front view of an example of a mobile communications device 100 to which example implementations described herein can be applied. The communication device 100 is a two-way communication device having at least voice and possibly also data communication capabilities, and the capability to communicate with other computer systems, for example, via the Internet. Depending on the functionality provided by the communication device 100, in various implementations the device may be a multiple-mode communication device configured for both data and voice communication, a smartphone, a mobile telephone or a PDA (personal digital assistant) enabled for voice communication.

The mobile communications device 100 includes a display screen 110, an alphanumeric keyboard or keypad 120; optionally one or more non-keyboard inputs, such as buttons 121-128 which may be navigational, function, exit or escape keys which may be inwardly depressed to provide further input function; or a rotatable input device such as a trackball 130 or scrollwheel or trackwheel (not shown). In some implementations, the keys in the keyboard 120 may not be actual physical keys but may be virtual keys displayed on a touch-sensitive area (not shown) within the display screen 110. The keys in the keyboard 120 may contain one or more letters, numbers or typographic symbols such as a "#" or pound sign.

The mobile communications device 100 includes a speaker 141, a visible indicator 142 and a plurality of user selectable icons shown on the display screen 110. The icons are each associated with functions that can be performed by the mobile device 100. For example, FIG. 1 shows a "Phone" icon 153 for accessing telephone functionality (associated with voice communications module 225), an "Address Book" icon 154 for accessing address book functions (associated with address book module), a "Calendar" icon 156 for accessing calendar functions (associated with a calendar module) and an options icon 159 (associated with an options module, which may be a separate module or executed by one or more existing modules). An icon is shown highlighted or focused by a caret or selection symbol 160 which can be navigated by a device user among the displayed icons through manipulation of the trackball 130 (or other navigational input device). The trackball 130 is also depressible, such that depression of the trackball 130 when an icon is highlighted or focused by selection symbol 160 results in the launch of functions of the associated module.

Figure 2:
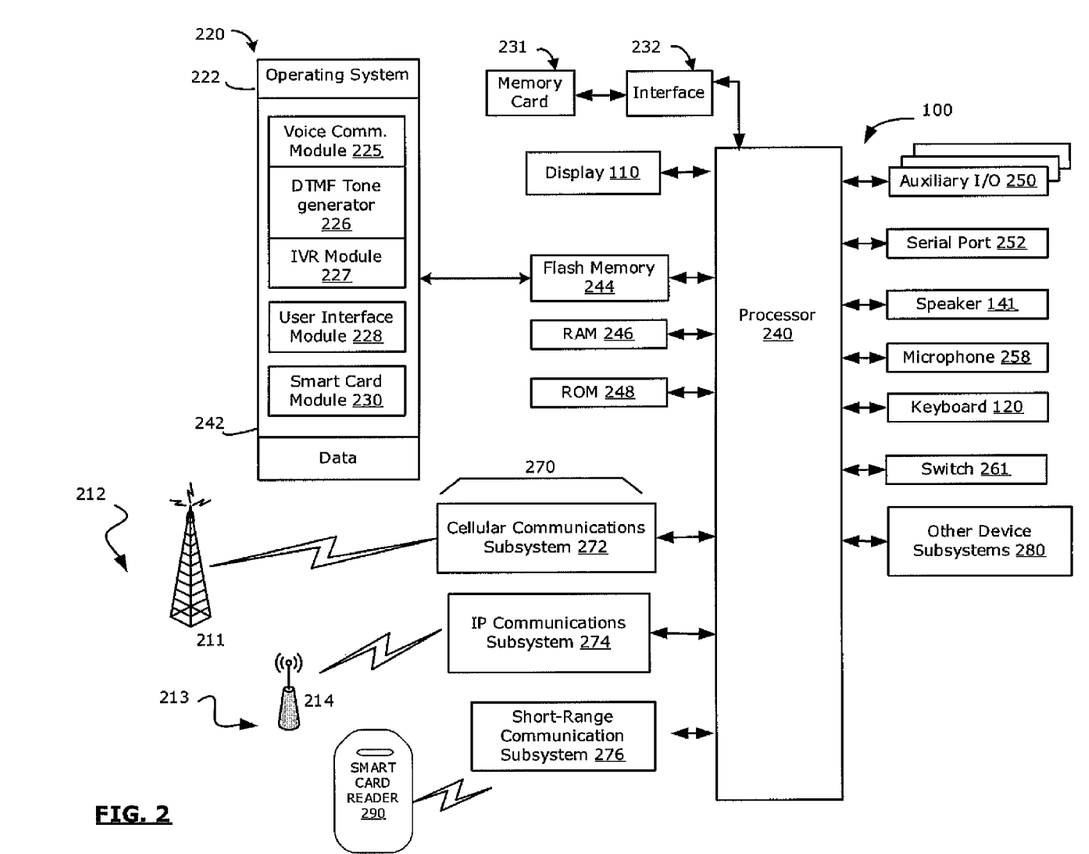
FIG. 2 is a block diagram illustrating a mobile communication device in accordance with one implementation of the present disclosure.

Referring to FIG. 2, the mobile communication device 100 includes a controller comprising at least one processor 240 such as a microprocessor which controls the overall operation of the mobile communication device 100. The microprocessor 240 interacts with communications subsystems shown generally at 270 and with further device subsystems such as: display 110; one or more auxiliary input/output (I/O) subsystems or devices 250; a serial port 252 such as a Universal Serial Bus (USB) data port; a speaker 141; a microphone 258; keyboard or keypad 120; a switch 261; a removable memory card 231 and interface 232; flash memory 244; random access memory (RAM) 246; read only memory (ROM) 248; and other device subsystems generally designated as 280. Some of the subsystems shown in FIG. 2 perform communication-related functions, whereas other subsystems may provide "resident" or on-device functions.

The particular design of the communications subsystems 270 depends on the network(s) in which the mobile communications device 100 is intended to operate. For example, the communication subsystem 270 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

The mobile communications device 100 may include a cellular communications subsystem 272 including a receiver, a transmitter, and associated components such as one or more antenna elements, and a processing module such as a digital signal processor (DSP) for exchanging signals with a wireless network 212. The mobile communication device 100 may send and receive communication signals over the wireless network 212 after the required network registration or activation procedures have been completed. The wireless network 212 may comprise a public land mobile network (PLMN). The mobile communications device 100 may be capable of both wireless voice and data communications via the wireless network 212.

The mobile communications device 100 may include an internet protocol (IP) communications subsystem 274 for communication with an IP network 213 through a wireless access point 214. The wireless access point 214 may be configured in accordance with one of the IEEE 802.11 specifications. The mobile communications device 100 may be equipped with a suitable antenna, RF transceiver, and software for accessing and using the WLAN connectivity of the wireless access point 214. The mobile communications device 100 may be equipped to support Voice-over-IP (VoIP) communications over the IP network 213.

The short-range communication subsystem 276 provides for communication between the mobile communication device 100 and different systems or devices, which need not necessarily be similar devices. For example, the subsystem 276 may include an infrared device and associated circuits and components, or a wireless bus protocol compliant communication mechanism such as a Bluetooth® communication module to provide for communication with similarly-enabled systems and devices, such as a smart card reader 290.

The processor 240 operates under stored program control and executes software modules 220 stored in memory such as persistent memory, for example, in the flash memory 244. The software modules 220 comprise operating system software 222 and may include a range of application modules, including, a voice communication module 225, a user interface module 228 and a smart card module 230. The software modules may include an address book module, a calendar module, a messaging module, a web browser module, an email module, a notepad module, a push content viewing module, a map module and a media player module, (not shown). The software modules 220 may among other things, each be implemented through stand-alone software modules, or combined together in one or more of the operating system 222 or one or more of the other software modules 220. In some implementations, the functions performed by each of the above identified modules may be realized as a plurality of independent elements, rather than a single integrated element, and any one or more of these elements may be implemented as parts of other software modules.

The voice communications module 225 may include a DTMF tone generator 226 for generating tones. The DTMF tone generator 226 interprets inputs on the device 100 and generates corresponding DTMF tones during telephone calls. The DTMF tone generator 226 also may generate DTMF tones in response to commands from other modules such as the voice communications module 225 and IVR module 227. Although depicted in FIG. 2 as a software module within the voice communications module 225, it will be appreciated that the DTMF tone generator 226 may be implemented wholly or partly through hardware in the cellular communication subsystem 272 or IP communications subsystem 274. For example, existing DTMF tone generation and detection capability within the communication subsystems 272, 274 may be leveraged by the voice communications module 225 to realize, at least in part, the functions of tone generation. The voice communications module 225 may include an IVR module 227 for functions associated with an IVR session, such as detecting an IVR session during a voice connection, storing and transmitting IVR response data, and detecting the termination of the IVR session.

The user interface (UI) module 228 renders and displays a graphical user interface (GUI) on a display 110 of the device 100 in accordance with instructions of the operating system 222 and modules 220 (as applicable). The GUI allows interaction with and control over the operation of the device 100. The GUI may be displayed on the display 110 which may be a touchscreen display. The GUI is rendered prior to display by the operating system 222 or a software module 220 which causes the processor 240 to display content on the display 110.

The software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

In some implementations, the auxiliary input/output (I/O) subsystems 250 may comprise an external communication link or interface, for example, an Ethernet connection. The mobile communication device 100 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile communication device 100 such as receipt of an electronic communication or incoming phone call, or for other purposes such as haptic feedback (touch feedback).

In some implementations, the mobile communication device 100 also includes a removable memory card 231 (typically comprising flash memory) and a memory card interface 232. Network access typically is associated with a subscriber or user of the mobile communication device 100 via the memory card 231, which may be a Subscriber Identity Module (SIM) card for use in a GSM network or other type of memory card for use in the relevant wireless network type. The memory card 231 is inserted in or connected to the memory card interface 232 of the mobile communication device 100 in order to operate in conjunction with the wireless network 212.

The mobile communication device 100 stores data in an erasable persistent memory, which in one example implementation is the flash memory 244. In various implementations, the data includes service data comprising information used by the mobile communication device 100 to establish and maintain communication with the wireless network 212. The data may also include user application data such as IVR response data, email messages, address book and contact information, calendar and schedule information, notepad documents, image files, and other commonly stored user information stored on the mobile communication device 100 by its user, and other data. The data stored in the persistent memory (e.g. flash memory 244) of the mobile communication device 100 may be organized, at least partially, into a number of databases each containing data items of the same data type or associated with the same application. For example, IVR response data, email messages, contact records, and task items may be stored in individual databases within the device memory. Content protection measures may be applied to one or more data items or databases within the device memory.

The serial data port 252 may be used for synchronization with a user's host computer system (not shown). The serial data port 252 enables a user to set preferences through an external device or software module and extends the capabilities of the mobile communication device 100 by providing for information or software downloads to the mobile communication device 100 other than through the wireless network 212. The alternate download path may, for example, be used to load an encryption key onto the mobile communication device 100 through a direct, reliable and trusted connection to thereby provide secure device communication.

A predetermined set of applications that control basic device operations, including data and voice communication applications will normally be installed on the mobile communication device 100 during or after manufacture. Additional applications and/or upgrades to the operating system 222 or software modules 220 may also be loaded onto the mobile communication device 100 through the wireless network 212, the auxiliary I/O subsystem 250, the serial port 252, the short-range communication subsystem 276, or other suitable subsystems or other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 100 and may provide enhanced on-device functions, communication-related functions, or both. Secure communication applications may enable electronic commerce functions and other such financial transactions to be performed using the mobile communication device 100.

The mobile communication device 100 may include a personal information manager (PIM) module (not shown) having the ability to organize and manage data items relating to a user such as, but not limited to, instant messaging, email, calendar events, voice mails, appointments, task items and IVR response data. The PIM module has the ability to send and receive data items via the wireless network 212. In some example implementations, PIM data items are seamlessly combined, synchronized, and updated via the wireless network 212, with the user's corresponding data items stored and/or associated with the user's host computer system, thereby creating a mirrored host computer with respect to these data items.

The mobile communication device 100 may provide two principal modes of communication: a data communication mode and a voice communication mode. In the data communication mode, a received data signal such as a text message, an email message, or web page download will be processed by the communication subsystem 272, 274 and input to the processor 240 for further processing and output on the display 110 or alternatively to an auxiliary I/O device 250. A user of the mobile communication device 100 also may compose data items, such as email messages, for example, using the keyboard 120 in conjunction with the display 110 and possibly the control buttons 121-128 or the auxiliary I/O subsystems 250. These composed items may be transmitted through the communication subsystems 272 and 274 over the respective wireless networks 212 and 213.

In the voice communication mode, the mobile communication device 100 provides telephony functions and operates as a typical cellular phone or as an VoIP phone. Received signals are output to the speaker 141 and signals for transmission would be generated by a transducer such as the microphone 258. The telephony functions are provided by a combination of software/firmware (i.e., the voice communication module 225) and hardware (i.e., the microphone 258, the speaker 141 and input devices). Alternative voice or audio I/O subsystems, such as a voice message recording subsystem, also may be implemented on the mobile communication device 100. Although voice or audio signal output is typically accomplished primarily through the speaker 141, the display 110 may also be used to provide an indication of the identity of a calling party, duration of a voice call, or other voice call related information. A list of stored IVR response data may be provided on the display 110 during a voice call and IVR session for use in responding to an IVR request as described below.

A voice call initiated by the mobile communications device 100 to a telephone number or VoIP address may be answered or terminated by an IVR system. The IVR system may act as an automated attendant, provide information and menu options, solicit information or complete service requests. If the voice call is answered by an IVR system, an IVR session may be established. Alternatively, the IVR system may initiate a voice call to the mobile communications device 100 and establish the IVR session. The IVR session may be established across a telephone network, such as the Public Switched Telephone Network (PSTN) or a VOIP network across a private or public IP network.

The IVR system may be programmed to support a wide range of services such as routing calls, verifying account balances, reviewing recent credit card purchases, checking movie or flight schedules, requesting prescription refills at a pharmacy and confirming or scheduling appointments. The IVR system may be programmed to request data from the mobile communications device 100, such as an account number, technical support code, or other sensitive personal or financial information in order to identify a user and provide the requested service. The IVR system may be programmed to request data from the mobile communications device 100 prior to terminating the IVR session and routing the call to an appropriate resource, such as a live operator or support personnel.

During the IVR session, the IVR system provides prompts or requests for information to the mobile communications device 100 and expects to receive responses to the requests. The IVR system may, on receiving a response to a first request, initiate a subsequent request for additional data from the mobile communications device 100. For example, after requesting an account number and receiving data representing the account number, the IVR system may issue a second request for a password associated with the account. Typically, a delay exists between the time the IVR system is ready to receive a first response such as an account number and the time the IVR system is ready to receive a second or subsequent response such as a password. The IVR system requests for information may be transmitted as pre-recorded or computer generated speech providing instructions or a list of numbered menu options for the IVR system.

Response data which is provided to fulfill an IVR request comprises data representing a menu option or other parameter which is defined in the IVR system or which identifies a user, such as an account number, a password or personal identification number (PIN), or an account number together with a PIN. The response data may be provided to reply to one or more requests from the IVR system. Response data that is used to reply to an IVR request may be unique to the IVR system, such as a system access code, or the response data may be commonly requested by a number IVR systems, such as a credit card number.

The response data may comprise one or more characters including letters, numbers, alphanumeric characters, typographic symbols, pause periods, wait periods, or a combination thereof which may be transmitted by the device 100 to respond to an IVR request or multiple IVR requests. For example, numbers may represent a user account number and symbols such as a "#" or pound sign may indicate the end of the response data.

The response data may be transmitted to the IVR system in a number of different formats and through a number of known communications channels depending on the IVR system, the communications network 212, 213 and the mobile communications device 100. The format for transmitting response data may be determined by the mobile communications device 100 and IVR system, by a user storing response data in a predetermined format, or by a user setting a transmission format identifier for the stored response data.

Response data transmission formats may include DTMF tones, digital data, or audio data, such as spoken words or recorded speech. The IVR system may include speech-recognition capabilities to allow the IVR system to support response data in the format of audio data. In some implementations, the mobile communication device 100 may include speech-recognition capabilities. In this implementation, the mobile communications device 100 may accept response data from a user in the form of speech which the mobile communications device 100 converts and sends to the IVR system in a DTMF tone or digital format.

The response data may be stored in the mobile communications device 100 as stored response data in a number of different formats as described above. The response data may be transmitted to the IVR system in the same format as the stored response data or in alternative transmission format supported by the IVR system, the communications network 212, 213 and the mobile communications device 100.

Responses to IVR requests during an IVR session may be provided on the mobile communications device 100 by a user depressing or selecting keys on the keyboard 120 or by a user inputting a spoken response through the microphone 258. As a result of keys being depressed on the keyboard 120, DTMF tones may be generated by the DTMF tone generator module 226 in the voice communications module 225 and transmitted over the communications subsystem 272, 274 to the IVR system. Alternatively, as a result of keys being depressed on the keyboard 120, digital data representing the depressed keys may be transmitted over the communications subsystem 272, 274 to the IVR system.

Figure 3:
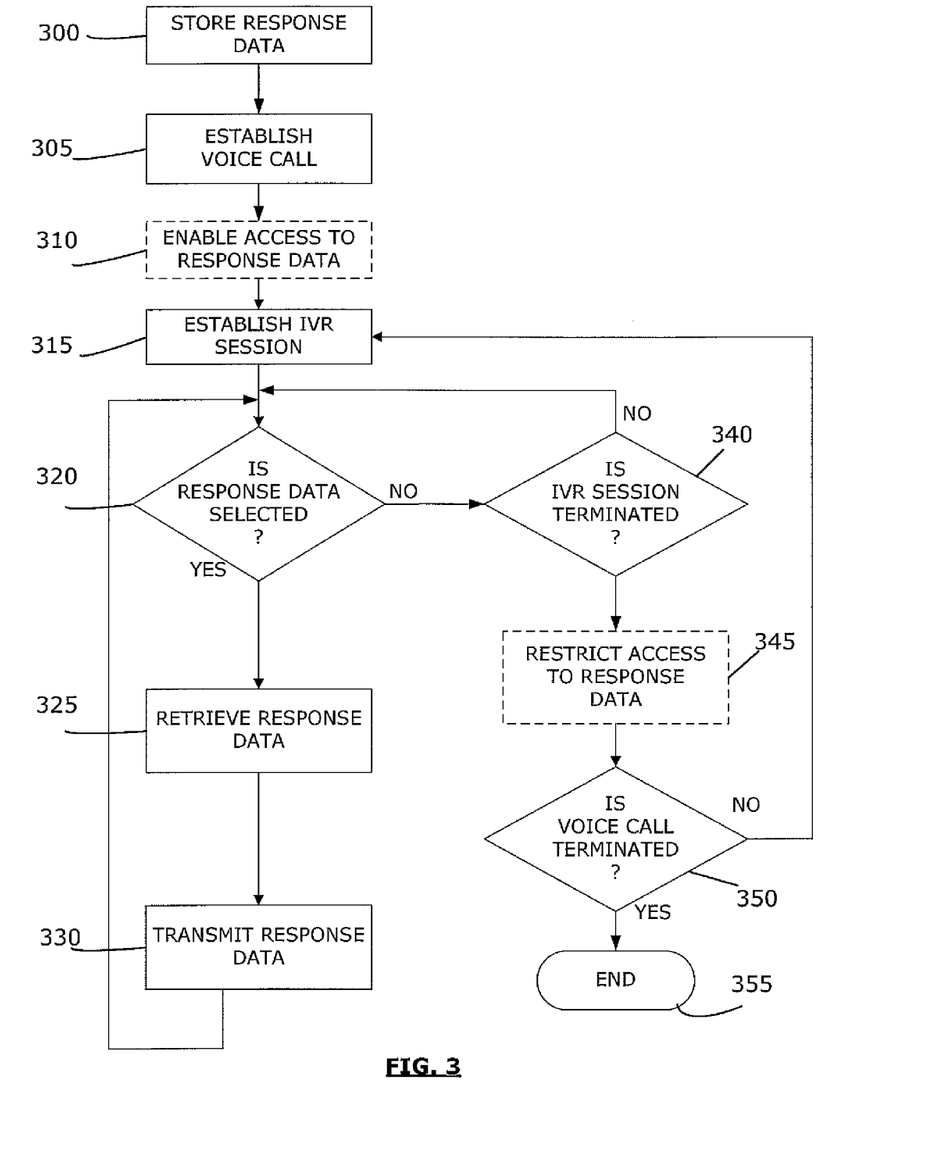
FIG. 3 illustrates a flowchart of a method described in the present application.

FIG. 3 illustrates an example implementation of a method of providing response data to an IVR request in the mobile communications device 100. Initially, at action 300, response data is stored in persistent memory, such as flash memory 244 in the mobile communications device 100. Response data typically is stored in the mobile communications device 100 in a digital data format such as digital information representing the response data; commands to generate the response data in the form of DTMF tones; or digital audio data. Alternatively, response data may be stored in an analog audio data format.

The response data may be stored at 300 in the mobile communications device by a number of ways. During an established IVR session, receipt of a predetermined input by the mobile communications device 100 may prompt the mobile communications device 100 to record and store response data being transmitted to the IVR system during the IVR session or during a portion of the IVR session. A second predetermined input may terminate the recordal of response data by the mobile communications device 100. In some implementations, where the IVR system or the mobile communications device 100 support speech recognition as described above, the response data may be stored by a user speaking the response data and the analog audio data being received by the microphone 258 of the mobile communications device 100.

IVR response data also may be received and stored in the mobile communications device 100 through a GUI provided by the IVR module 227 and user interface module 228. Response data may be received and stored by the mobile communications device 100 as a result of a user depressing keys on the keyboard 120 to indicate the letters, numbers, alphanumeric characters, typographic symbols, pause periods and wait periods comprising the response data. Alternatively, a user may "copy" and "paste" data from other sources in the mobile communications device 100 such as from an email message containing an account or confirmation number which a user may store as response data. In another implementation, the response data may be stored in the mobile communications device 100 by synchronizing the mobile communications device 100 with the user's corresponding data items stored and/or associated with the user's host computer through the personal information manager (PIM).

A number of IVR response data entries may be stored along with associated response data identifiers, such as a number, name or key sequence, in order to identify and select the response data. The stored response data may be organized and rendered by the IVR module 227 and user interface module 228 and displayed on the display 110, for example, as a selectable menu of IVR response data and response data identifiers.

A transmission format identifier also may be entered by a user and associated with the stored response data. The transmission format identifier may be retrieved with the stored response data and indicate to the mobile communications device 100 the format used for transmitting the response data to the IVR system.

In one implementation, since the response data may include sensitive financial or personal information, security measures may be applied to the stored IVR response data. For example, a password input may be requested before allowing the functions of storing, reviewing, editing or sending the response data on the mobile communications device. The response data may be stored in a content-protected area of the mobile communications device 100 and an additional security measure, such as the verification of a smart card in the smart card reader 290, may be required in order to access the IVR response data.

At action 305, a voice call is established between the mobile communications device 100 and a second device associated with the called telephone number or VOIP address. If the voice call to the second device is answered by or terminated at an IVR system, an IVR session is established at 315. Alternatively, the voice call and IVR session may be established by the IVR system initiating a call to the mobile communications device 100.

If the response data is stored in a content-protected area of memory, access to the response data may be restricted. Access to the IVR response data may be enabled after it is determined by the voice communications module 226 that a voice call has been established, as shown at 310. Alternatively, access to the response data may be enabled only after the IVR session is established at 315 as determined by the IVR module 227. In one implementation, a user input to the mobile communications device 100 may be provided to indicate an IVR session has been established and to enable access to the IVR response data. Optionally, a password or smart card and PIN input may be requested by the mobile communications device 100 during the IVR session in order to permit use of the IVR response data. For example, the mobile communications device 100 may prompt a user for a password or smart card and PIN information after the voice call is established at 305, after the IVR session is established at 315, or after a select response data command is received at 320.

The select response data command may be received at the mobile communications device 100 to retrieve and transmit response data for responding to a question or request for information from the IVR system. The select response data command may be received by the mobile communications device 100 as a keyboard selection, a menu selection on a touchscreen display 110 or the select response data command may be associated with one of the control keys 120-128 on the mobile communications device 100. Speech recognition technology on the mobile communications device may be used to receive and interpret a spoken select response data command and a spoken name or identifier of the IVR response data. In one implementation, a control key 120-128 input may be received and associated with a command to display a menu or list of IVR response data on the display 110. A subsequent input may be received to select the IVR response data.

The select response data command may comprise a sequence of commands to cause the mobile communications device to display a user interface associated with the IVR module 227, display one or more menus containing stored response data and response data identifiers, and receive a first input selecting the stored response data. The select response data command also may comprise displaying a menu or prompt and receiving a second input selecting the transmission format for the response data.

At 325 the selected response data is retrieved from memory. In one implementation, the response data may be output by the IVR module 227 and user interface module 228 to the display 110 of the device 100 allowing a user to review the response data. A further input may be received by the mobile communications device 100 to confirm and approve the transmission of the response data to the IVR system.

At 330, the response data is transmitted through the communications subsystem 272, 274 to the IVR system. The format for transmitting the response data may be indicated by the IVR system and mobile communications device, a stored transmission format identifier, or the select response data command. If the response data is transmitted in a DTMF format, the action of transmitting the response data may comprise the DTMF tone generator 226 generating tones corresponding to the characters in the response data. If the response data is transmitted in an analog format, such as recorded speech, the action of transmitting may comprise playing the recorded speech. Once the response data has been transmitted, the mobile communications device 100 awaits a subsequent select response data command at 320.

If a select response data command has not been received, the IVR module 227 determines if an IVR session has been terminated at 340. If the IVR session has not been terminated, the mobile communications device 100 remains in a state waiting for a select response data command.

If the IVR session has been terminated, for example, if the voice call has been routed to another destination which is associated with a live person, the mobile communications device 100 then determines if the voice call has been terminated at 350. The IVR module 227 may detect the termination of the IVR session or a user input to the mobile communications device 100 may signal the end of the IVR session. In one implementation, IVR module 227 may deem an IVR session to be terminated after a predetermined time period has elapsed. For example, where IVR response data has been provided and time has elapsed, during which for example, the IVR system places the voice call on hold or in a queue to be routed to a subsequent destination, the IVR module 227 may determine the IVR session has ended.

Where content protection or other security measures are applied to the IVR response data, access to the response data may be restricted at 345 after the IVR session has ended. It will be appreciated that one or more IVR sessions may be established and terminated during the course of a voice call as a call is re-routed to different attendants or people. If another IVR session is established during the voice call, access to the IVR response data may be subsequently enabled. Alternatively, access to the IVR response data may be enabled for the duration of the voice call and restricted after the voice call has ended at 350.

At action 350, the voice communications module determines whether the voice call has terminated. If not, a subsequent IVR session may be established at 315. If the voice call has terminated, the method of providing response data ends at 355. Access to the response data may be restricted after the end of the voice call (not shown) rather than after the end of each IVR session.

As described above, the IVR response data comprises characters including letters, numbers, typographic symbols, pauses and wait periods. A pause period may enable the response data to comprise a reply to more than one IVR request. For example, where an IVR system is known to request an account number followed by a request for a password or PIN, response data may be stored which includes the account numbers, one or more pause periods corresponding to the time an IVR system is expected to take to initiate the subsequent request, and the PIN numbers. Action 330 of transmitting response data thus comprises the IVR module 227 and communication systems 272, 274 sending the characters comprising a reply to a first IVR request, sending no data or silence for the duration of the pause period, and sending the characters comprising a reply to the subsequent IVR request. A pause period in the response data may be followed by a command defined in the IVR system, such as a "#" symbol signalling the end of a reply. In the above example, the response data may comprise an account number, a # or end of data command symbol, one or more pause periods corresponding to the time an IVR system is expected to take to initiate the subsequent request, and the PIN numbers.

The stored IVR response data may include a wait period to interrupt the retrieval and transmission of the response data. For example, rather than storing a sensitive password in the mobile communications device 100, an account number and a wait period may be stored as a response data entry. The wait period signals the IVR module and mobile communications device 100 when retrieving response data at action 325 to take additional actions. In response to a wait period character, the IVR module 227 and user interface module 228 may render a prompt for user input on the display 110. A user may input additional response data, such as a password, by selecting keys on the keyboard 120 or providing a spoken input which is recognized by the mobile communications device 100. A terminate wait period command is input to the mobile communications device 100, such as selection of a "#" sign or key, to signal the end of the additional response data. The wait data received in the device 100 may be added to the stored response data in the place of the wait period and transmitted to the IVR system at 330. Alternatively, the IVR module 227 may retrieve and transmit the response data characters before acting upon the wait period. The additional wait data thus may be input to the device 100 and sent to the IVR system as subsequent transmission. It will be appreciated that a number of pause periods, wait periods, commands or symbols, letters and numbers and combination thereof may be used in the stored response data to provide a response suitable to reply to one or more requests in the IVR system.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various implementations presented above are merely examples and are in no way meant to limit the scope of this disclosure. Variations of the innovations described herein will be apparent to persons of ordinary skill in the art, such variations being within the intended scope of the present application. In particular, features from one or more of the above-described implementations may be selected to create alternative implementations comprised of a sub-combination of features which may not be explicitly described above. In addition, features from one or more of the above-described implementations may be selected and combined to create alternative implementations comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of providing response data in interactive voice response (IVR) system sessions by electronic devices, the method comprising:
    storing response data in a memory of an electronic device;
    establishing a voice call between the electronic device and an IVR system;
    detecting an IVR session;
    enabling a select response data command only after detecting the IVR session;
    receiving, at a user interface of the electronic device, a select response data command during the IVR session with the IVR system;
    in response to the select response data command, retrieving the response data from the memory;
    transmitting the response data to the IVR system; and
    the response data being independent of the IVR session.

2. The method of claim 1 further comprising enabling access to the stored response data after detecting the IVR session and restricting access to the response data after termination of the IVR session.

3. The method of claim 2 wherein restricting access to the response data comprises applying content protection to the stored response data.

4. The method of claim 2 wherein termination of the IVR session occurs after a predetermined time period.

5. The method of claim 1 wherein the response data comprises at least one character selected from the group consisting of: letters, numbers, typographic symbols, pause periods and wait periods.

6. The method of claim 5 wherein transmitting a wait period comprises:
 displaying a prompt on a user interface;
 receiving wait data;
 detecting a terminate command; and
 transmitting the response data and wait data to the IVR system.

7. The method of claim 1 wherein storing response data comprises recording a speech response and wherein transmitting response data comprises playing the speech response.

8. The method of claim 1 wherein the select response data command comprises displaying a list of one or more response data identifiers associated with the stored response data and receiving an input selecting a response data identifier.

9. The method of claim 8 wherein the select response data command further comprises displaying a list of one or more response data transmission formats and receiving a second input selecting a response data transmission format.

10. The method of claim 1 wherein transmitting response data comprises transmitting dual-tone multi-frequency (DTMF) data.

11. An electronic device for providing response data in interactive voice response (IVR) system sessions, comprising:
 a voice communications interface;
 a controller for controlling the operation of the electronic device;
 a memory connected to the controller, for storing response data;
 a user interface; and
 the controller being configured to: store the response data in the memory; establish a voice call to an IVR system; detect an IVR session; enable a select response data command only after detecting the IVR session; receive at the user interface a select response data command; retrieve the response data in response to receiving the select response data command; and transmit the response data to the IVR system; the response data being independent of the IVR session.

12. The electronic device of claim 11 wherein the electronic device is a mobile electronic device.

13. The electronic device of claim 11 wherein the controller is configured to enable access to the stored response data after detecting the IVR session and restrict access to the response data upon termination of the IVR session.

14. The electronic device of claim 13 wherein termination of the IVR session comprises expiry of a predetermined time period.

15. The electronic device of 11 wherein the memory includes content protection.

16. The electronic device of claim 11 wherein the response data comprises at least one character selected from the group consisting of: letters, numbers, typographic symbols, pause periods and wait periods.

17. The electronic device of claim 11 wherein the electronic device further comprises a user interface and the controller is configured, in order to transmit a wait period, to:
 display a prompt on the user interface;
 receive wait data;
 detect a terminate command; and
 transmit the response data and wait data to the IVR system.

18. A non-transitory computer-readable storage medium in an electronic device having a voice communications interface for connecting to interactive voice response (IVR) systems, the medium having stored thereon computer-readable and computer-executable instructions, which, when executed by a processor, cause the electronic device to perform actions comprising:
 storing response data in a memory of the electronic device;
 establishing a voice call between the electronic device and an IVR system;
 detecting an IVR session;
 enabling a select response data command only after detecting the IVR session;
 receiving, at a user interface of the electronic device, a select response data command during the IVR session with the IVR system;
 in response to the select response data command, retrieving the response data from the memory;
 transmitting the response data to the IVR system; and
 the response data being independent of the IVR session.

* * * * *